(12) United States Patent
Cappi et al.

(10) Patent No.: US 9,756,795 B2
(45) Date of Patent: Sep. 12, 2017

(54) PROTECTION SYSTEM FOR MECHANIZED COVERING OF PLANT CROPS

(75) Inventors: Angelo Cappi, Vignola (IT); Andrea Cappi, Vignola (IT); Roberto Luscardo, Vignola (IT); Georgi Dimitrov Todorov, Sofia (BG)

(73) Assignee: MAGIF S.A.S. DI CAPPI ANGELO & C., Vignola Province of Modena (IT)

( * ) Notice: Subject to any disclaimer, the term of this patent is extended or adjusted under 35 U.S.C. 154(b) by 279 days.

(21) Appl. No.: 14/126,570

(22) PCT Filed: Jun. 20, 2012

(86) PCT No.: PCT/EP2012/061808
§ 371 (c)(1),
(2), (4) Date: Mar. 28, 2014

(87) PCT Pub. No.: WO2012/175546
PCT Pub. Date: Dec. 27, 2012

(65) Prior Publication Data
US 2014/0259900 A1    Sep. 18, 2014

(30) Foreign Application Priority Data

Jun. 22, 2011   (IT) .................... B02011A0357

(51) Int. Cl.
*A01G 13/02* (2006.01)
(52) U.S. Cl.
CPC ....... *A01G 13/025* (2013.01); *A01G 13/0206* (2013.01)
(58) Field of Classification Search
CPC .. A01G 13/0206; A01G 13/04; A01G 13/025; A01G 13/02; A01G 9/22;
(Continued)

(56) References Cited

U.S. PATENT DOCUMENTS

| | | | |
|---|---|---|---|
| 711,225 A * | 10/1902 | Putnam et al. .... | A01G 13/0206 135/908 |
| 1,106,624 A * | 8/1914 | Cadwallader et al. . | E04F 10/02 135/903 |

(Continued)

FOREIGN PATENT DOCUMENTS

| AU | 17253 83 | 1/1985 |
|---|---|---|
| BO | 2011A000109 | 3/2011 |

(Continued)

OTHER PUBLICATIONS

International Search Report for PCT/EP2012/061808 dated Sep. 17, 2012.
(Continued)

*Primary Examiner* — Joshua Huson
(74) *Attorney, Agent, or Firm* — Marvin Petry; Stites & Harbison PLLC

(57) ABSTRACT

Protection system for the mechanized covering of plant crops which are usually planted in rows, of the type in which vertical poles (1) are arranged along the rows and have heights greater than those of the crowns of the plants to be protected, the poles being interconnected by longitudinal (3) and transverse (2) cables to form an overhead supporting lattice roof structure, the system comprising means for mechanizing the steps of extending flexible protective sheets (4) over the roof structure and removing them therefrom, characterized in that: the poles (1) are in a staggered or grid arrangement such that they are transversely aligned in even-numbered rows (F2, F4, etc.) only and in odd-numbered rows (F1, F3, etc.) only, the whole arrangement being such that the transverse connecting cables (2) intersect the longitudinal cables (3) alternately at points at which neither the transverse nor the longitudinal cables are supported by poles (1); in that the transverse cables (2) run above the longitudinal cables at the intersection points; and in that each protective sheet (4) is arranged so that its median longitudinal part slides on the longitudinal cable (3), passing alternately over a support pole (1), where it is supported (Continued)

from below by the longitudinal cable and by the portion of transverse cable (2) which interacts with the pole, and subsequently passing under a transverse cable (2) at the point of intersection with the longitudinal cable where the sheet is supported solely by the longitudinal cable, the whole arrangement being designed to form a protective covering which is supported from below and above by the support cables (2, 3), and which is therefore able to effectively withstand even considerable atmospheric turbulence.

10 Claims, 2 Drawing Sheets

(58) Field of Classification Search
    CPC ........ A01G 9/222; A01G 9/14; A01G 9/1407;
                                              A01G 9/1438
    USPC .................................................... 47/22.1, 46
    See application file for complete search history.

(56) References Cited

U.S. PATENT DOCUMENTS

| 1,264,419 | A | * | 4/1918 | Mercer | ............. | A01G 13/0206 |
|---|---|---|---|---|---|---|
| | | | | | | 47/22.1 |
| 3,140,563 | A | * | 7/1964 | Allen | ................ | A01G 13/0206 |
| | | | | | | 135/120.2 |
| 3,932,958 | A | * | 1/1976 | Kistler, Jr. | ................ | E04B 7/14 |
| | | | | | | 248/353 |
| 4,068,404 | A | | 1/1978 | Sheldon | | |
| 4,296,568 | A | * | 10/1981 | Dukes | ................ | A01G 13/0206 |
| | | | | | | 47/17 |
| 5,265,373 | A | * | 11/1993 | Vollebregt | ............... | A01G 9/22 |
| | | | | | | 160/84.01 |
| 5,311,699 | A | | 5/1994 | Huffman | | |
| 5,519,965 | A | * | 5/1996 | Robinson | ........... | A01G 13/0206 |
| | | | | | | 428/907 |

FOREIGN PATENT DOCUMENTS

| DE | 19 18 300 | 10/1969 |
|---|---|---|
| DE | 10 2009 047383 | 6/2011 |
| EP | 1 728 417 | 12/2006 |

OTHER PUBLICATIONS

Written Opinion of the International Searching Authority for PCT/EP2012/061808 dated Sep. 17, 2012.

* cited by examiner

PROTECTION SYSTEM FOR MECHANIZED COVERING OF PLANT CROPS

The invention relates to a protection system for the mechanized covering of plant crops, for example fruit crops such as cherries, grapes or the like, with transparent sheets or protective nets, hereinafter referred to simply as "protective sheets", characterized by simplicity of construction and by the extensive and distributed fastening of the sheets to the overhead supporting lattice structure which supports them, thus ensuring that the protective covering formed by the sheets is positioned in a highly stable manner when in use, even in the presence of considerable atmospheric turbulence. Patent application no. BO2011A000109 in the name of the present applicant is cited as the most similar prior art to the invention, and it discloses the provision of cross pieces spaced apart on the protective sheets, these ends of these cross pieces being designed to interact with appropriate overhead guiding and fastening means suitably arranged on and along the rows of plants. By comparison with this solution, it is no longer necessary to provide the sheets with cross pieces, and considerable benefits are obtained as a result. The characteristics of the present invention, and the advantages resulting therefrom, will be made clearer by the following description of a preferred embodiment of the invention, illustrated purely by way of non-limiting example in the figures on the two attached sheets of drawings, in which:

FIGS. 1 and 2 areschematic views of the system, in a plan view from above and in perspective;

Figure 2:
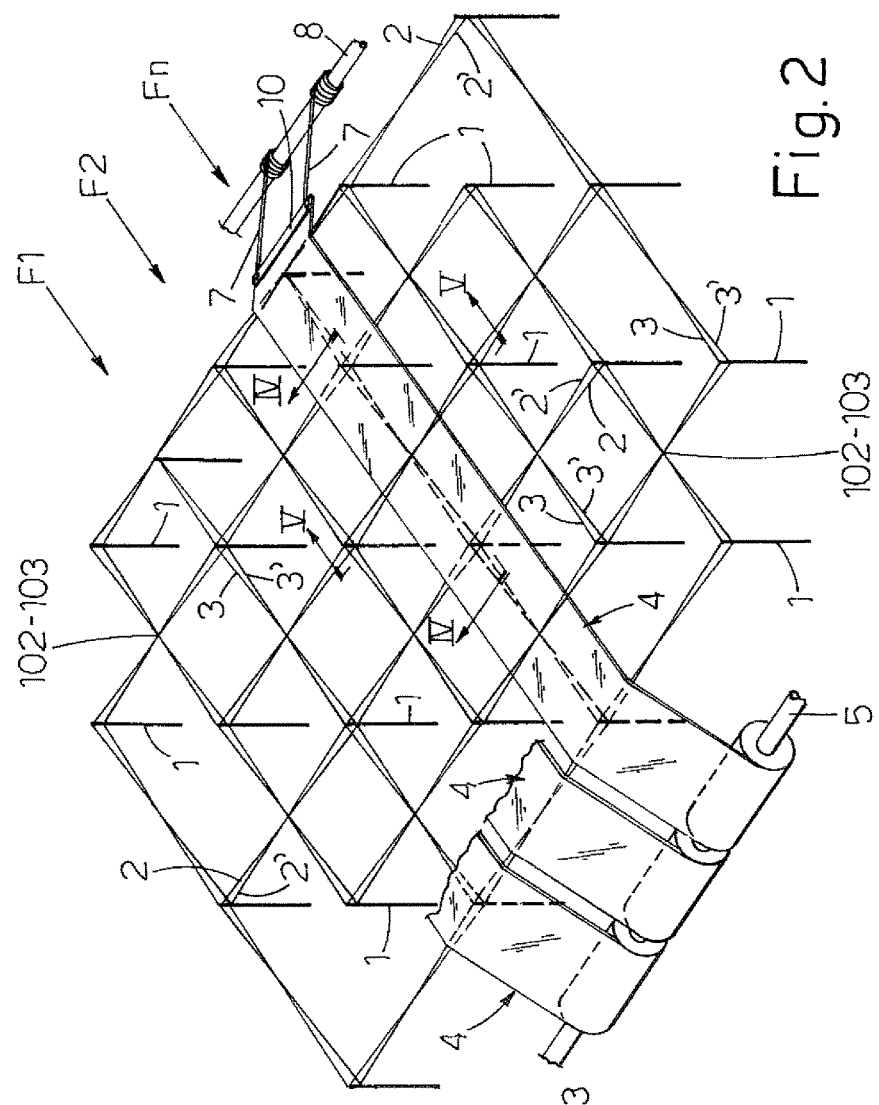
Figure 1:
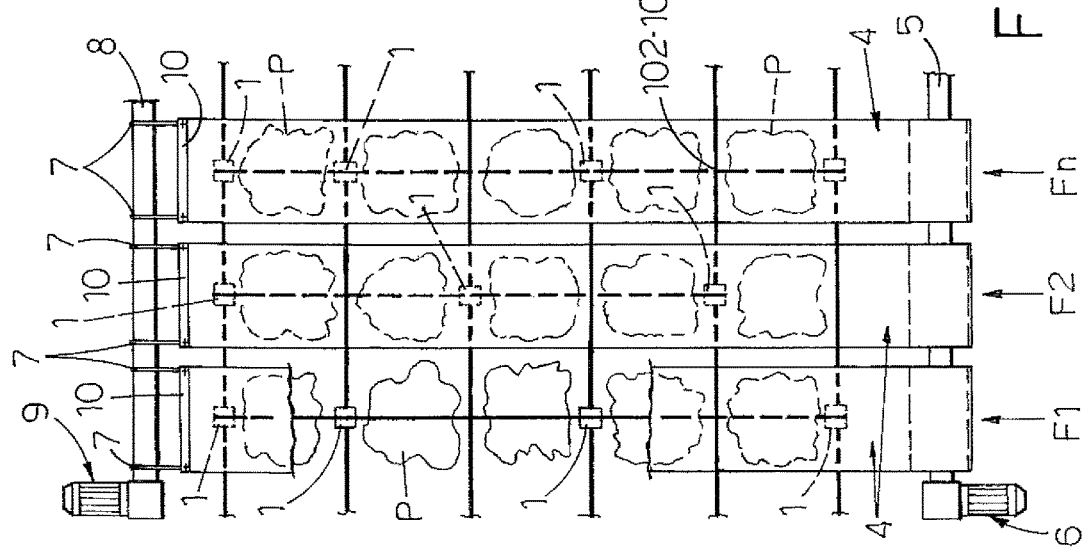
Figure 3:
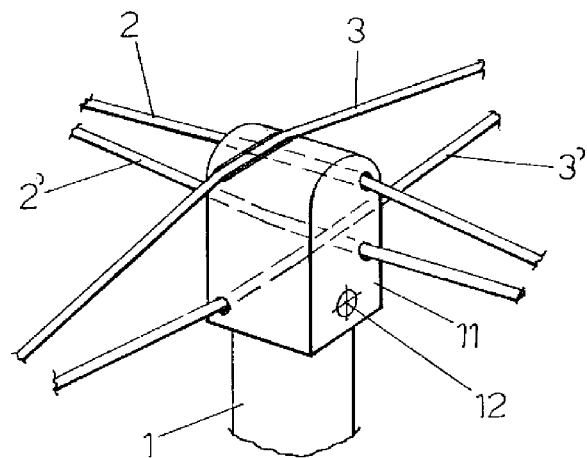
FIG. 3 is a perspective view of an element for covering the upper ends of the poles which carry the overhead longitudinal and transverse cables to support the protective sheets.
Figure 4:
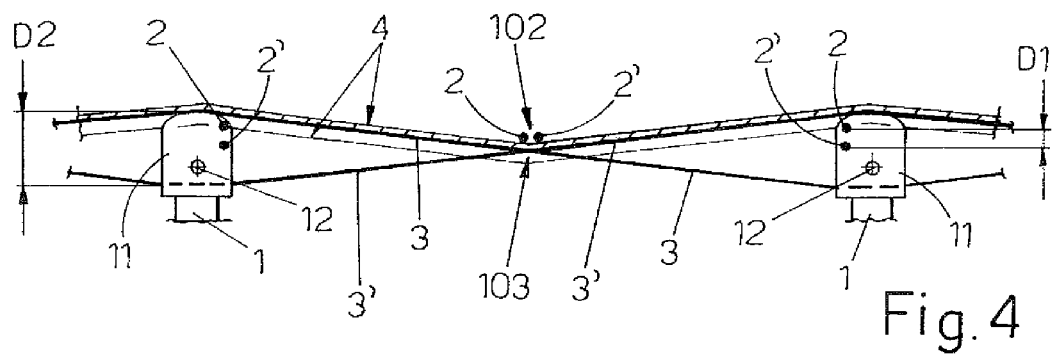
FIGS. 4 and 5 show two details of the system in views taken, respectively, along the section lines IV-IV and V-V of FIG. 2.
Figure 5:
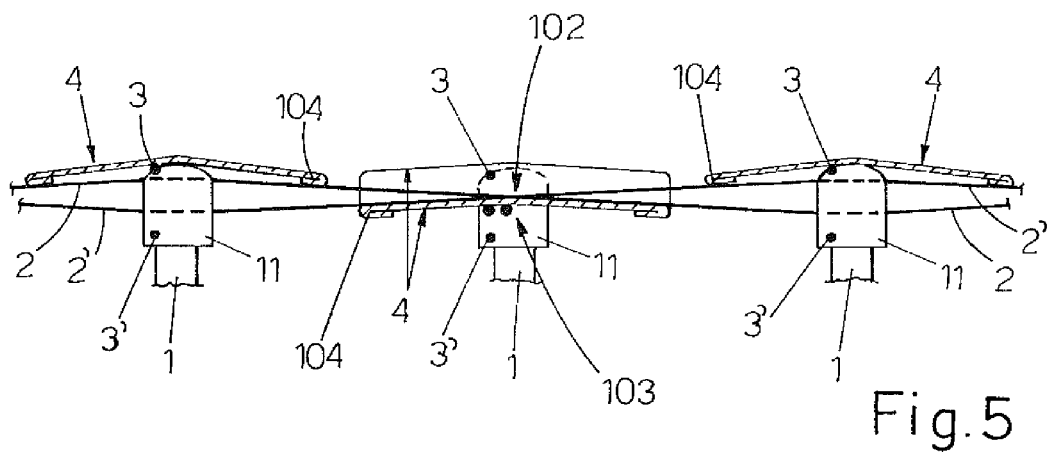

In FIGS. 1 and 2, the symbols F1, F2, Fn denote rows of plants P, in each of which vertical poles 1 are suitably anchored in the ground, the height of the poles being such that their upper ends are suitably higher than the crowns of the plants P, these poles being arranged in a staggered or grid pattern, for example with only the poles of the even-numbered rows F2, F4 etc. and only the poles of the odd-numbered rows F1, F3 etc. being aligned transversely with each other. Additionally, each even-numbered pole is positioned longitudinally at the mid-point of the distance between two consecutive odd-numbered poles, and the inverse of the same arrangement is found in the case of the odd-numbered poles. The poles 1 of the even-numbered rows and those of the odd-numbered rows are interconnected by transverse cables, more specifically by at least two transverse cables 2, 2' which intersect in the shape of an X, are arranged on an imaginary vertical plane, and are spaced apart by a predetermined distance D1 and fixed at the positions of the poles 1, but intersect each other at points 102 located on the median longitudinal axis of each adjacent row where there are no support poles for the cables. The poles 1 of the various rows are also interconnected by longitudinal cables, more specifically by at least two longitudinal cables 3, 3' which also intersect each other in the shape of an X, are arranged on an imaginary vertical plane, and are spaced apart from each other by a predetermined distance D2 at the positions of the poles 1 but intersect each other at points 103 positioned at the mid-points of the distances between the consecutive poles 1 of each row. As a result of the offset arrangement of the poles 1 and a suitable inclination of the longitudinal cables relative to the transverse ones, the points of intersection 103 of the longitudinal cables are located on the same vertical as the points of intersection 102 of the transverse cables, and preferably, as shown in FIG. 4, the intersections 103 are located under the points of intersection 102 of the transverse cables (see below). In FIGS. 1 and 2 it can be seen that each row can be covered, longitudinally for example, by at least one corresponding sheet 4, whose width is related to that of each row and is such that the sheets of adjacent rows do not touch and/or interfere with each other in a negative way, while remaining as close as possible to each other, each sheet being initially wound around a collecting shaft 5 placed in any suitable position at one end of the row and driven by a reduction drive unit 6, and at least the head end of each sheet being connected by longitudinal cables 7 to a collecting shaft 8 which is located at the other end of the rows and is driven by a reduction drive unit 9 which can be electrically connected to the aforementioned unit 6, for operation in step with the latter. Each pair of reduction drive units 6 and 9 can drive a plurality of sheets simultaneously. The feed and collection shafts with their reduction drive units can be located on the ground or in a position above ground level. The initial distinction made between the feed and collection shafts is not essential, since, in solutions that will be evident to persons skilled in the art, for example with a different direction of entry to or exit from the shaft of the sheets 4 or the cables 7, each shaft 5 and 8 can serve simultaneously either as a feed shaft or as a collection shaft. The reduction drive units 6 and 9 can be fixed, to provide an opening or closing movement of the sheets which may or may not be fully automatic, in response to a manual or semiautomatic or automatic command, with the provision of sensors and programmed logic units which, for example, react to the atmospheric conditions and/or forecasts of these conditions. In a different embodiment, the reduction drive units 6 and 9 can be removable for use on a plurality of shafts 5 and 8 in succession. The number 10 indicates an optional transverse reinforcement which can be provided at the head end of the sheets 4 and which can have its ends connected to the pulling cables 7. The sheets 4 can be reinforced on their longitudinal edges by having these edges suitably folded back as indicated by 104 in FIG. 5, and reinforcing cores (not shown) formed by auxiliary cables or by an extension of the pulling cables 7 can be placed inside these reinforced edges. It is also possible to provide suitable reinforcement for the median longitudinal area of the sheets 4 with which the sheets slide over and in contact with the tops of the poles 1, each of these tops being provided for this purpose with a rounded protective head of suitable material, as indicated by 11 in FIG. 3. The number 12 schematically indicates the means for fixing the head 11 to the top of the pole 1. The sheets 4 can be monolithic or can be composite, being formed for example from two adjacent sheets, fixed to each other by their inner longitudinal sides, thereby forming a sheet which is provided with the aforesaid median and longitudinal reinforcement. As seen in FIGS. 1 and 2, the sheets 4 pass over the transverse cables 2 which are supported by the poles 1 of each row, but pass under the transverse cables 2 which are supported by the poles of the adjacent rows, in such a way that, when the cables 7 are collected on the shaft 8 in order to extend the sheet 4 over a row, the sheet itself passes over the portions of transverse cables 2 supported by the poles 1 of the row concerned but passes under the area of intersection 102 of the transverse cables 2 supported by the poles of the adjacent rows, in such a way that, partially as a result of the longitudinal tension to which it is subjected, the sheet assumes a roof-like transverse configuration in the form of a symmetrical double slope, as shown in FIG. 5, and a broken or zigzag longitudinal configuration as shown in FIG. 4, with the sheet made to adhere to the upper branches of the X-shaped spans of the longitudinal cables 3. Additionally, over the whole extension of these longitudinal spans, the sheet 4 is given a roof-like transverse configuration with a symmetrical double slope, since the sheet interacts with the lower branches of the X-shaped spans of the transverse cables 2, in the portions comprising their points of intersection 102. Clearly, with the solution described, the sheets 4 are securely fastened to the support cables in an arrangement capable of withstanding even considerable atmospheric turbulence while not creating pockets in which rain and/or hail could accumulate. The longitudinal cables 3 and/or the transverse cables 2 can be monolithic continuous cables or can be formed from lengths of cable positioned in sequence with each other and suitably fastened to the support poles 1. The inclinations of the longitudinal and/or transverse cable can be varied in order to provide different inclinations of the sheets, including a zero inclination in the case in which the cables are parallel to each other or are composed of a single transverse cable 2 and a single longitudinal cable 3. Clearly, the invention can be varied in its construction in numerous ways without departure from the guiding principle of the invention as described and illustrated and as claimed below. In the claims, the references in brackets are provided purely for guidance and do not limit the scope of protection of the said claims.

The invention claimed is:

1. A protection system for covering plant crops which are planted in rows with poles driven into the ground along rows having heights greater than those of the crowns of the plants to be protected comprising:
    a first grid comprising first rows of poles extending in a longitudinal direction being spaced apart by a first distance,
    a second grid comprising second rows of poles extending in the longitudinal direction spaced apart by said first distance and being located midway between the rows of the first rows of poles,
    the poles of the first rows being aligned transversely only with the poles of the other of the first rows of poles,
    the poles of the second rows of poles being aligned transversely only with the poles of the other of the second rows of poles,
    the transversely aligned poles of the second rows being located midway, taken in the longitudinal direction, between the transversely aligned poles of the first rows of poles,
    first and second longitudinal cables interconnecting the poles of each of the first and second rows, wherein at a first pole of each row, the first cable is supported by the pole higher than the second cable is supported by that pole by a distance D2, beyond which the first and second cables crisscross so that at the next pole in that row, the second cable is supported higher than the first cable is supported by that pole by distance D2, said crisscrossing pattern continuing along the length of that row,
    first and second transverse cables interconnecting each of the transversely aligned poles of both the first and second rows of poles, wherein at a first pole of transversely aligned rows of poles, the first cable is supported by the pole higher than the second cable is supported by that pole by a distance D1 which is less than D2 and wherein the first and second transverse cables are located vertically between the first and second longitudinal cables, beyond which the first and second transverse cables crisscross so that at the next transversely aligned pole, the second cable is supported higher than the first cable by distance D1, and located vertically between the first and second longitudinal cables supported at that pole, and
    separate protective sheets extending along each of the rows of poles, each sheet passing over all of the poles of that row, including over both the longitudinal cables and the transverse cables at that pole, and the protective sheets, when passing over the transverse aligned first and second cables midway between two poles of that row, pass beneath the first and second transverse cables.

2. The protection system according to claim 1, the sheets being mounted to unwind from a supply shaft at a first end of the rows and connected to cables at a second end of the rows, which cables are mounted to wind around a collecting shaft.

3. The protection system according to claim 2, wherein the longitudinal cables turn down at the first end toward the supply shaft and at the second end toward the collection shaft to provide a sloped protection cover at each end of the plants in that row.

4. The protection system according to claim 2, including a motor connected to each of the shafts to turn them to feed sheets in the longitudinal direction over the plants.

5. The protection system according to claim 4, in which the motors operate to automatically unwind and wind the sheets in response to a manual command from sensors and programmed logic units which react to atmospheric conditions.

6. The protection system according to claim 1, wherein each sheet, as a result of going over the poles in its row, sliding above the longitudinal cables in its row and going under the transverse cables between the poles in its row, has a shape, along its length which is a double sloped roof which slopes down from its longitudinal center to its side edges.

7. The protection system according to claim 6, in which the poles are provided on their upper ends with a rounded shape which has a low coefficient of friction with the sheets, these heads being fixed to the poles and having openings for supporting the longitudinal cables and transverse cables.

8. The protection system according to claim 7, wherein the cables are formed from lengths fastened to housings of the covering heads.

9. The protection system according to claim 7, in which the sheets are reinforced on their longitudinal edges and are provided with internal reinforcing cores, while reinforcement is also provided in the median longitudinal areas of the sheets, which are designed to slide and bear on the upper heads of the support poles and on the longitudinal cables, each sheet being formed from two adjacent sheets fixed to each other at their inner longitudinal edges so as to form in combination a sheet which has the median longitudinal reinforcement.

10. The protection system according to claim 1, wherein at the locations where the longitudinal and transverse cables intersect each other which are not supported by the poles, the intersection of the transverse cables is slightly above the intersection of the longitudinal cables and at a height lower than the tops of the poles, such that the portion of the sheets extending between two consecutive poles is forced to bear on the upper branches of the pair of underlying longitudinal cables so as to assume a V- shaped lateral configuration with a wide angle which helps to stabilize the installation of the sheets and therefore to impart considerable resistance of the sheets to atmospheric turbulence while also facilitating the runoff of precipitation.

* * * * *